United States Patent [19]
Kalua et al.

[11] Patent Number: 5,191,368
[45] Date of Patent: Mar. 2, 1993

[54] SYSTEM FOR PROJECTING KALEIDOSCOPIC IMAGES FOR GROUP VIEWING

[76] Inventors: Kevin A. Kalua, 750 Bell Canyon Rd.; Paul A. Nelson, Jr.; Paul A. Nelson, Sr., both of P.O. Box 928, all of Angwin, Calif. 94508

[21] Appl. No.: 836,260

[22] Filed: Feb. 18, 1992

[51] Int. Cl.$^5$ .............................................. G03B 21/00
[52] U.S. Cl. ......................................... 353/2; 359/617
[58] Field of Search ................. 353/1, 2; 359/616, 617

[56] References Cited

U.S. PATENT DOCUMENTS 2,152,424  3/1939  Wetmore ................................. 353/2
5,094,525  3/1992  Nelson, Jr. et al. .................... 353/1

FOREIGN PATENT DOCUMENTS 0397171  6/1924  Fed. Rep. of Germany .......... 353/1
3118735  12/1982  Fed. Rep. of Germany ...... 359/616
0513288  2/1955  Italy ........................................ 353/1

Primary Examiner—William A. Cuchlinski, Jr.
Assistant Examiner—William C. Dowling
Attorney, Agent, or Firm—Harold D. Messner

[57] ABSTRACT

The present invention relates to a system for group viewing of kaleidoscopic images in which such system is a fully-integrated unit that is compact, attractive and of relatively low cost. In preferred form, the system uses a TEE-shaped outer housing in which system elements for the separate functions of cooling, for kaleidoscopically projection, for viewing and for angular pattern driving are accurately and compactly provided. The system elements that provide the functions of cooling, kaleidoscopic projection and viewing are positioned in first and second parallel arms (of circular cross section). While a third transverse arm (of square cross section attached to a flared base supported on a horizontal surface of a desk, table or the like, supports the angular driving elements.

24 Claims, 3 Drawing Sheets

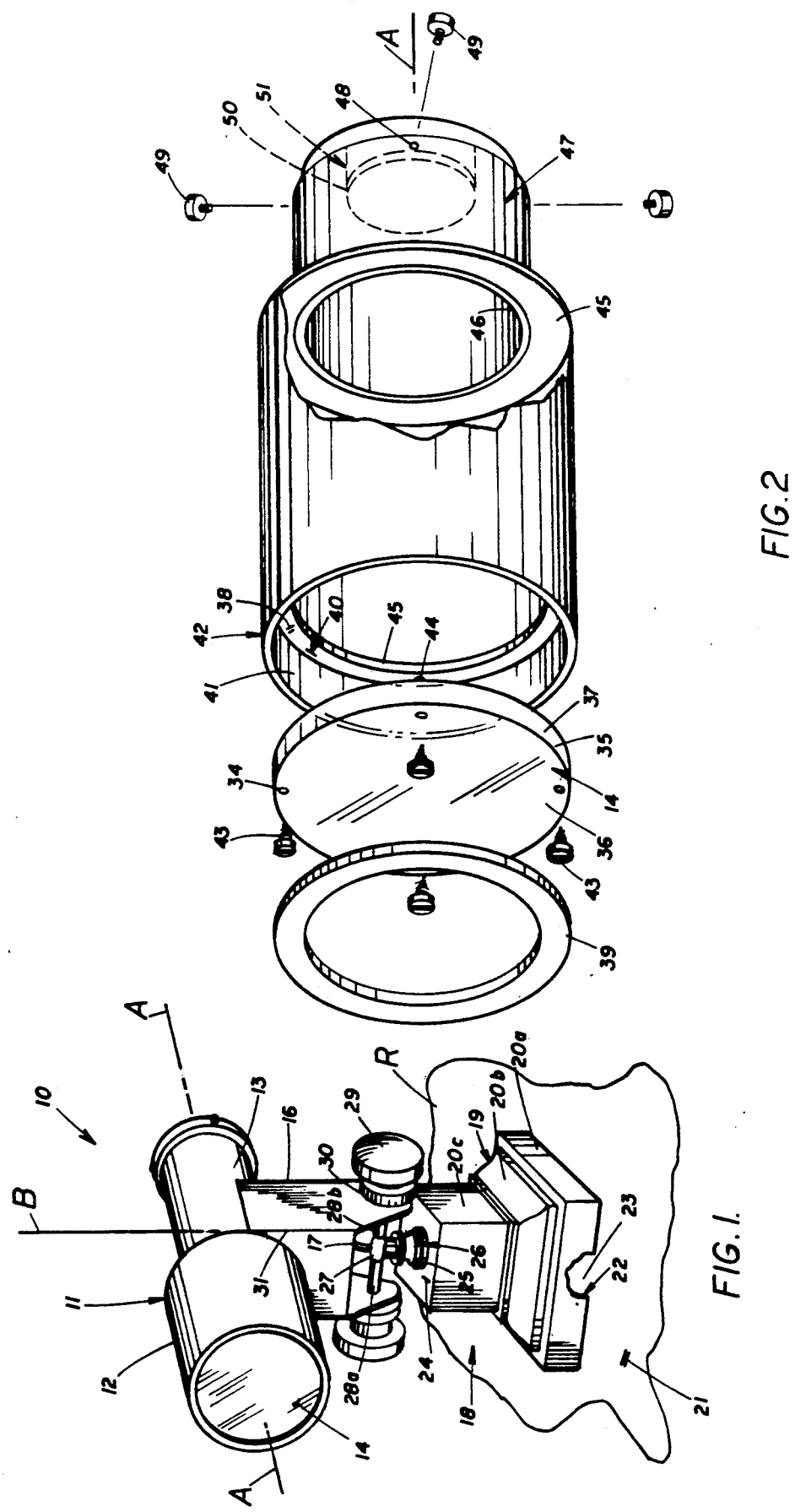

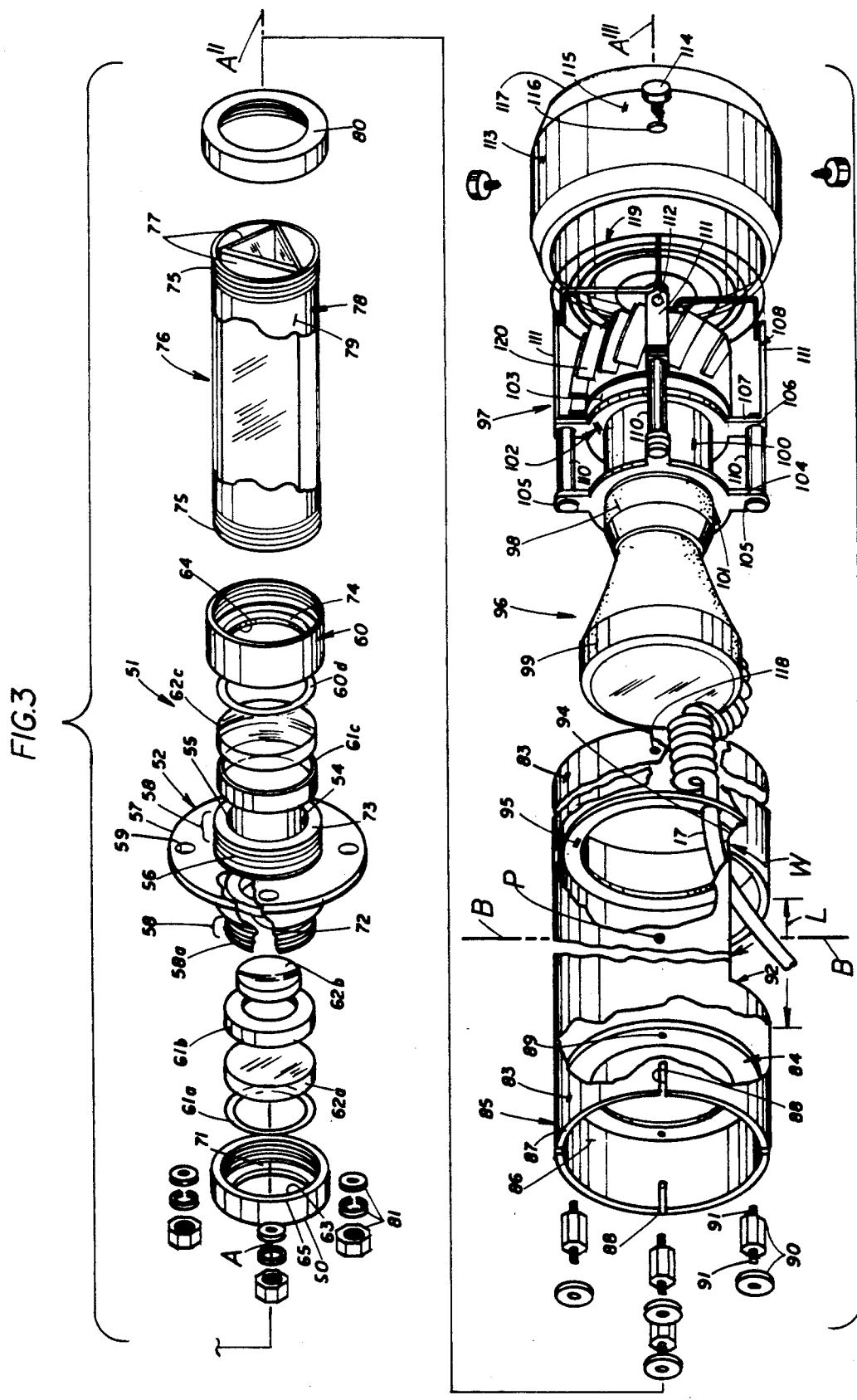

SYSTEM FOR PROJECTING KALEIDOSCOPIC IMAGES FOR GROUP VIEWING

SCOPE OF THE INVENTION

The present invention relates to kaleidoscopes and in particular to a system for projecting kaleidoscopic images for viewing by a group (more than a single person) using a TEE-shaped housing in which system elements for cooling, for kaleidoscopically projection, for group viewing and for angular driving object elements are accurately and compactly provided. In one form of the invention, the cooling, kaleidoscopic projection and viewing elements of the system are positioned in first and second parallel arms (both of circular cross section). While a third transverse arm (of square or rectangular cross section) supports the angular driving elements, such transverse arm including a flared base supported on a horizontal surface of a desk, table or the like. In another aspect, the system projects kaleidoscopic images on a continuous basis while being cooled by a diffused air flow.

BACKGROUND OF THE INVENTION

Kaleidoscopes of various forms and embodiments are well known in the art. In this simplest form, the hand-held kaleidoscope includes a cylinder in which reflective mirrors extend longitudinally with the mirrors being at an angle of which 360 degrees is a multiple. One end of the cylinder has a cover provided with an eye-piece, while at the far end, the cylinder is closed by two spaced discs between colored objects are loosely located usually in a separately rotatable box-like cavity (usually called an object box). The latter discs are transparent such that light can enter the far end of the cylinder. When the hand-held kaleidoscope is held to a person's eye with the far end pointed to a source of light (artificial or natural), the colored objects between the transparent discs and within the angle of the mirrors are viewed as a primary image, but simultaneously with an angular array of reflected images. Rotating the object box, results in changes in the pattern of the images.

While hand-held kaleidoscopes have retained their standings as a favorite toy, their effect is usually limited to one person's edification and inspiration. In many cases, an enhancement of such images is desirable. For example, in a co-pending Application entitled "SYSTEM FOR PROJECTING KALEIDOSCOPIC IMAGES FOR GROUP VIEWING USING A DYNAMICALLY OPERATING KALEIDOSCOPE AS AN INTEGRAL ELEMENT", Paul A. Nelson Jr. et al, Ser. No. 07/563,097 filed Aug. 3, 1990 now U.S. Pat. No. 5,094,525 issued Mar. 10, 1992, there is shown a system for enlarging the images of a hand-held kaleidoscopes using a projection system that includes a lamp to emit light through the kaleidoscope to be marketed. In that way, potential buyers could view the images in a group setting. It has now been discovered that group viewing of kaleidoscopic images is desirable in and of itself provided the elements of such a system could be integrated to a compact, attractive and relative inexpensive unit.

SUMMARY OF THE INVENTION

The present invention relates to a system for group viewing of kaleidoscopic images in which such system is a fully-integrated unit that is compact, attractive and of relatively low cost. In preferred form, the system uses a TEE-shaped outer housing in which system elements for the separate functions of cooling, for kaleidoscopically projection, for viewing and for angular pattern driving are accurately and compactly provided. That is, the system elements that provide the functions of cooling, kaleidoscopic projection and viewing are positioned in first and second parallel arms (of circular cross section). A third transverse arm (of square cross section) attached to a flared base supported on a horizontal surface of a desk, table or the like, supports the angular driving elements.

Now in more detail, the housing of the invention includes rear projecting screen at the remote end of the first parallel arm upon which the kaleidoscope images can be viewed exterior of the Tee-shaped housing. At the remote end of the second parallel arm is a fan having impeller blades at the exterior of a motor whereby air is forced through the second parallel arm and thence is exhausted through the third transverse arm in a diffused, non-turbulent pattern across the desk, table or the like. For this purpose, a base attached to the transverse arm is fared toward the exhaust port of the transverse arm. At the end of the motor housing is fitted a multi-ringed frame for attaching the fan relative to the second parallel arm, and for attaching a separate reflector bulb socket and associated reflector bulb of a high intensity lamp relative to the same arm. The lengths of the parallel arms are controlled so that the edge of the reflector bulb is adjacent to the junction point of the arms, such termination position being in the direction of the second parallel arm. (The junction point is by definition the intersection of the axes of symmetry of the arms.) Such support mounts to and extends from a cylindrical hub forming the end of the first parallel arm.

The third transverse arm also has upright walls which support a transversely mounted motor (relative the axis of symmetry) having a drive gear (connected to a shaft) which has peripheral gear teeth which drives a second gear (hereinafter called the driven gear) concentric of the axis of symmetry of the second parallel arm and positioned between the junction point and the reflector bulb. Such driven gear is a constituent part of a high temperature object box assembly. Such box assembly also includes a pair of rectangularly shaped fixed supports cantilevered from fixed housing of the motor and a segmented cylindrical object box sandwiched therebetween. The cantilevered fixed supports have a pair of aligned openings into which the cylindrical object box extends. The object box includes female and male hubs that are threaded to mate together and have enlarged outer terminal that are larger than the central openings of the cantilevered supports through which the hubs extend. The driven gear is pinned to the exterior surface of the female member so that rotation of the drive gear of the drive motor imparts rotation to the object box. Such rotation causes different shapes and sizes of dichromatic glass within the threaded male and female members to shift position with respect to an outer wall thereof so that light form said bulb is affected by such positions before being reflected by a integrated angular mounted mirror-lens assembly primarily located in the first parallel arm. Such mirror-lens assembly includes a central annular hub support having a central opening concentric of the collinear axes of symmetry of the parallel arms from which a series of female-male threadable members are cantilevered therefrom in opposed directions. These female-male members can be threadable mounted relative to each other to accurately position a compound mirror (located at one end adjacent to the object box assembly) and a series of spacers and lens relative to the position of the remote screen at the end of the first parallel arm. A plurality of annular rings are fitted against the walls of the first and second arms concentric of the axes of symmetry to provide support for the various elements of the system of the invention. For example, a first annular ring in the first parallel arm includes equi-spaced openings relative to the axis of symmetry. Into such openings are fitted a series of rubberized washer, bolt and nut assemblies to fixedly connect the mirror-lens assembly (via its central annual hub) relative to the first parallel arm.

DETAILED DESCRIPTION OF THE DRAWINGS

FIG. 1 is a perspective view, partially cut-away, of the system of the invention showing a Tee-shaped outer housing having parallel first and second arms and a transverse third arm of square cross section;

FIG. 2 is a perspective, exploded view of an end portion of the first parallel arm of the Tee-shaped outer housing of FIG. 1 illustrating the construction of the rear viewing screen and the position (via phantom line) of an end of the projection-mirror assembly within a reduced mounting section thereof;

FIG. 3 is a perspective, exploded view of the projection-mirror assembly of FIG. 2;

FIG. 4 is a perspective, exploded view of central and end portions of the first parallel arm of the Tee-shaped housing of FIG. 1 showing the axes of symmetry and the first and second parallel arm and their junction point with the axis of symmetry of the third transverse arm as well as illustrating the construction of the fan assembly in the second parallel arm;

Figures 5, 6:
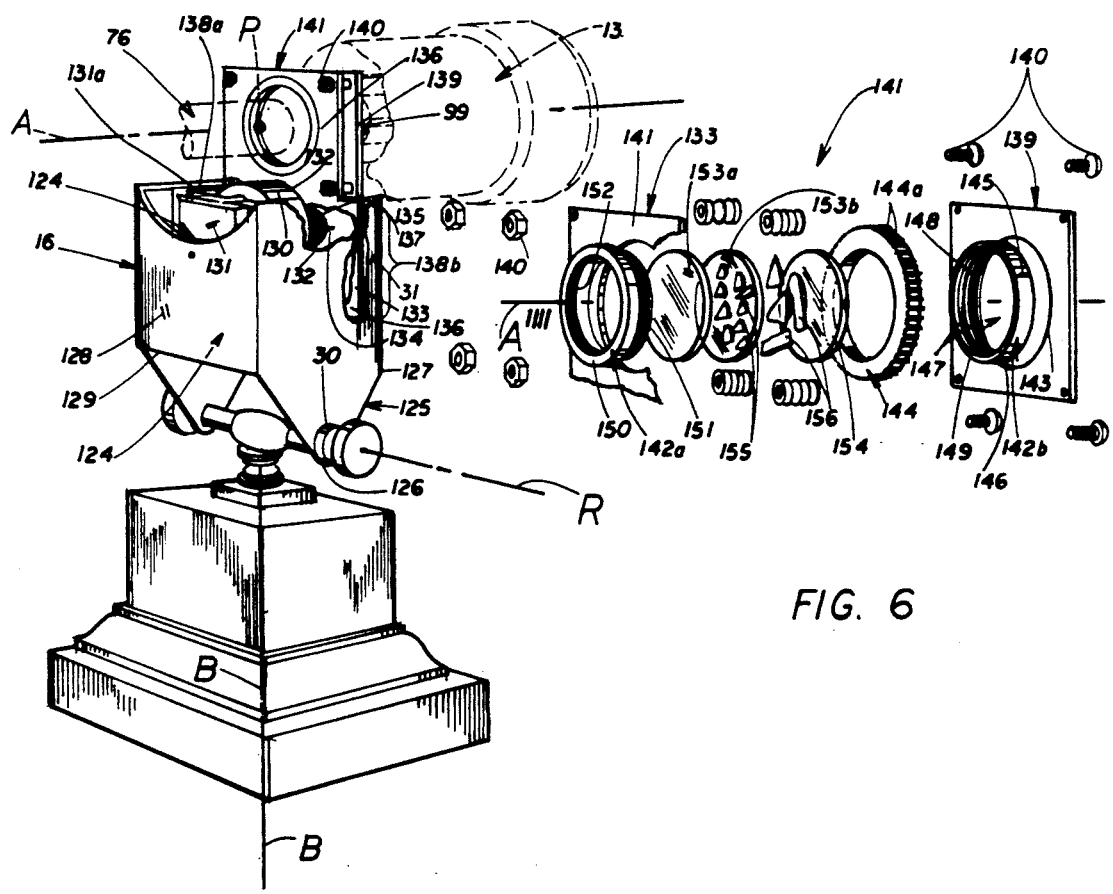

FIG. 5 is a perspective, partially cut-away, view of the base and third transverse arm of the Tee-shaped housing of FIG. 1 illustrating the position of its axis of symmetry relative to those of the parallel first and second arms including the junction point as well as showing mounting arrangement of an object box assembly relative to the junction point, the mirror-projection assembly and the high intensity lamp (the latter being in phantom line), and;

FIG. 6 is a perspective, exploded view of the object box assembly of FIG. 5.

DETAILED DESCRIPTION OF THE INVENTION

FIG. 1 illustrates system 10 of the present invention. The purpose of the system 10: to optically project a beam of high intensity light through kaleidoscopic and projection elements positioned within first and second parallel arms 12 and 13 of a Tee-shaped housing 11 (such elements to be described in detail below) onto a rear viewing screen 14 at the remote end of the first parallel arm 12. As the light passes through the kaleidoscopic elements, a portion of such elements are driven in rotation about collinear axes of symmetry A of the first and second parallel arms 12 and 13 by angular pattern changing elements (also to be described below). Such elements includes a primary driving means mounted within a third transverse arm 16 having an axis of symmetry B normal to collinear axes of symmetry A. As a result, an increased lateral and transverse kaleidoscopic image is produced at the screen 14 wherein the pattern that is constantly changing as a function of time.

AC electrical power is provided via a series of conductors (not shown) within insulated sheath 17 initially penetrating within flared base 18 and thence through adjustable mount 19 and third transverse arm 16 to system elements upstream thereof. The base 18 is formed of a series of rectangular segments 20a, 20b, 20c of decreasing transverse and longitudinal dimensions as a function of height relative to a desk or table surface 21. Such shape and configuration of the base 19 permits air exhausting from the arm 16 to be diffused across the desk or table surface 21. The segments 20a, 20b and 20c being integrally formed, define common side walls generally indicated at 22 and enclose a hollow cavity 23 therein. Top wall 24 of the base includes an opening 25 through which a bracket 26 extends. The bracket 26 includes a Tee-shaped mount 27 at its remote end wherein parallel arms 28a, 28b are provided with threads to receive decorative thumbscrews 29. The thumbscrews 29 extend through openings 30 in opposed beveled terminating side walls 31 of the third arm 16. In that way, the Tee-shaped housing 11 is permitted rotation about axis of rotation R to change the height and angle of the screen 14 relative to the desk or table surface 21.

As shown in FIG. 2, the screen 14 is cylindrically shaped having an circumferential edge 35 and first and second broad surfaces 36, 37. The screen 14 uses coated materials to permit rear viewing from the side opposite to original image impingement and is available from Daylite Projections, Polycoat Division, Cincinnati, Ohio. Near the edge 35 of the screen 14 are a series of openings 34. These openings 34 are angularly spaced relative to an axis of symmetry A' coincident with the axes of symmetry A of the parallel arms 11, 12 of FIG. 1, previously mentioned. The openings 34 permit attachment of the screen 14 to an interior ring 40 of enlarged view tube 42 via a series of screws 43. The interior ring 40 is permanently affixed to the enlarged view tube 42 by a series of tack welds (not shown) at the intersection of broad surface 39 with interior surface 41. A series of threaded openings 44 in the broad surface 38 of the interior ring 40 are axially aligned with the openings 34 of the screen 14 to receive the series of screws 43. After attachment, the heads of the screws 43 are hidden from exterior viewing by attaching exterior ring 39 to the interior surface 41 of the enlarged view tube 42, as by an adhesive.

At an end opposite from the screen 14, note that the enlarged view tube 42 is provided with yet another ring 45 having an opening 46 through which a transition tube 47 extends. The transition tube 47 is flared at its intersection with ring 45 and permanently affixed to the ring 45. The purpose of the transition tuber 47: to form a stepped transition between the required larger diameter of the view tube 42 and a smaller diametered tube (not shown) that forms the remainder of the first parallel arm 12 of FIG. 1. Attachment of such smaller diametered tube to the transition tube 47 is provided by a series of threaded openings 48 for receiving a series of screws 49. Such attachment provides correct positioning of a female cap 50 of projection-mirror assembly 51 (shown in phantom line) within the transition tube 47 vis-a vis the screen 14.

FIG. 3 shows the projection-mirror assembly 51 in more detail.

As shown, the projection-mirror assembly 51 includes a central annular hub support generally indicated at 52. The hub support 52 includes a side wall 54 concentric of an axis of symmetry A" defining a central opening 55. An outer surface 56 of the side wall 54 is stepped over a central region to form a flange 57 and is of a reduced dimension over end regions 58. The flange 57 includes openings 59 for attachment of the entire projection-mirror assembly 51 relative to the Tee-shaped housing 11 as explained below. The end regions 58 are threaded and appear to extend from the flange 57 in cantilevered fashion although in fact, the hub support 52 is integrally formed by machining operations. The threads 58a of such regions 59 accept female cap 50 previously mentioned in FIG. 2 as well as female collar 60. The dimensions of the female cap 50 and female collar 60 are controlled (diameter and length parallel with axis of symmetry A") such that selected combinations of spacers 61a, 61b, 61c and 61d and lenses 62a, 62b and 62c are captured by and fit within respective cavities 63, 64 thereof. In addition, the lengths of the female cap 50 and female collar 60 vis-a-vis that of the assembled spacers 61a-61d and lenses 62a-62c are such that a plurality of male and female threads (associated with the end regions 58 on one hand and on cap 50 and collar 60 on the other), engage before planar pressure is brought to bear upon the assembled spacers 61a-61d and lenses 62a-62c. Planar pressure occurs when the distance between a series of stops 71, 72, 73 and 74 interior thereof are less than that of the assembled spacers 61a-61d and lenses 62a-62c. The positions of the stops 71-74 are measured along the axis of symmetry A". Stop 71 comprises an enlargement of side wall 65 of the female cap 50. Stop 72 is formed in the end region 58 of the hub support 52 adjacent to the cap 50 (in a first direction relative to the flange 57). Stop 73 also occurs at the end wall 54 but faces the female collar 60 (in a second direction relative to the flange 57 but opposite to the first direction). Stop 74 is formed in the mid-position of female collar 60.

Since the cap 50 and collar 60 have interior threads, they are called female elements or members, while the end regions 58 have exterior threads and are called male elements or members. Rotation of the female cap 50 and collar 60 relative to the hub support 52 brings the spacer-lens combinations into planar contact with each other and the stops 71-74 to provide correctly imaged and projected optical characteristics. That is, kaleidoscopic patterns projected by a mirror assembly 76 also positioned in contact with female collector 60 can be correctly imaged and projected by the spacer-lens combinations captured within the female cap 50 and female collar 60.

Mirror assembly 76 consists of compound mirror 77 arranged in a convention triangular manner within a tube 78. The mirror 77 extends lengthwise along axis of symmetry A". The tube 78 includes an outer surface 79 which is provided with threads 75 near its ends for attachment to the female collar 60 and to another cap 80, respectively.

When assembled, the mirror assembly 76, the spacer-lens combinations and the female cap 50 and collar 60 are unitarily attached to the central support hub 52. In turn, the hub 52 (with above attached thereto) is mounted within elongated tube 85 of FIG. 4 defining an axis of symmetry A''', such attachment using nuts-and-washers 81 in combination with the openings 59 of the flange 57, such elongated tube 85 forming the remainder of the first parallel arm 12 and the totality of the second parallel arm 13 of the Tee-shaped housing 11 of FIG. 1. Such mounting arrangement brings the axes of symmetry A', A" and A''' of FIGS. 2, 3 and 4, respectively into collinearity with axes of symmetry A of FIG. 1.

FIG. 4 shows elongated tube 85 in more detail.

As shown, the elongated tube 85 includes an inner support annulus 84 attached to interior broad surface 86 of side wall 87. The support annulus 84, in turn, is provided with a series of threaded openings 89 connecting the inner broad surface 86 with its outer circumferential surface 83. A series of washer-spacer-headless bolts 90 rotatable attach to the threaded openings 89. The washer-spacer-bolts 90 have threaded tails 91 which also threadably attach to the nuts-and-washers 91 of FIG. 3. In that way, the projection-mirror assembly 51 of FIG. 3 (including the hub support 52, the mirror assembly 76, the spacer-lens combinations 61a-61d, 62a-62c and the female cap 50 and collar 60) can be unitarily attached relative to elongated tube 85. The tube 85, in turn, can be attached via angularly positioned longitudinal slots 88 relative to the axis of symmetry A''' to the enlarged view tube 42 of FIG. 2. Such attachment is accomplished via angularly aligning the openings 49 within the transition tube 47 with the slots 88 of the elongated tube 85 and then rotatably attaching screws 49 relative to the threaded openings 48. As a result, the parallel first arm 12 of the Tee-shaped housing 11 of FIG. 1 are formed.

Note in FIG. 4 that the tube 85 includes a central transverse slot 92 formed in the side wall 87. The arcuate width W of the slot 92 is approximately equal to its length L, such length L being measured parallel to the axis of symmetry A'''. The width W is also bisected by the transverse axis of symmetry B which intersects axis of symmetry A''' at junction point P. Also entering through central slot 92 is the sheath 17 of electrical conductors that is coiled after passing through openings 94 of annular mount 95 for electrical connection to lamp assembly 98 and to a fan 97.

The lamp assembly 96 includes a socket 98 and a high intensity lateral projection bulb 99 concentric of the axis of symmetry A'''. The socket 98 has a base 100 attached to a support ring 101 which in turn is connected to a second support ring 102 attached to housing 103 of the fan 97. The support ring 101 has radial extending tabs 104 fitted with openings 105. The openings 105 are axially aligned with openings 106 formed in short legs 107 of L-shaped tabs 108 of the support ring 102. The aligned openings 105, 106 accommodate fasteners 110 comprising a plurality of bolts, spacers and nuts. Longer legs 111 of the L shaped tabs 108 are provided with a series of openings 112 at their remote ends. These openings 112 are threaded and aid in the attachment of the longer legs 111 of the L-shaped tabs 108 to squat closure member 113 via attaching screws 114. The closure member 113 is cylindrically shaped and includes a side wall 115 having angularly spaced openings 116 (relative to axis of symmetry A''') that are spatially aligned with the series of openings 112 in the longer legs 111 of the tabs 108, as well as being aligned with angularly spaced openings 118 in the side wall 87 of the elongated tube 85. Note that the side wall 115 of squat closure member 113 is beveled at its terminating edge 117 to form a stop for capture of an filter guard 119. Hence ambient air can be forced into the squat closure member 113 through the filter guard 119 by rotation of impeller blades 120 of the fan 97.

In assembly, the elongated tube 85 is sandwiched between the closure member 113 and the longer legs 111 of the L-shaped tabs 108 of the support ring 102.

The screws 114 extend through the angularly aligned openings 118, 116 and 112.

As previously indicated, the tube 85 is attached via angularly positioned longitudinal slots 88 relative to the axis of symmetry A''' to the enlarged view tube 42 of FIG. 2 via angularly aligning the openings 48 within the transition tube 47 with the slots 88 of the elongated tube 85 and then rotatably attaching screws 49 relative to the threaded openings 48. Assuming that squat closure member 114 is attached to the elongated tube 85, then the parallel first and second arm 12, 13 of the Tee-shaped housing 11 of FIG. 1 are fully constructed.

FIG. 5 shows how integration of operation of the transverse arm 16 relative to parallel arms 12, 13 occurs.

As shown, the transverse arm 16 is of a square cross section and includes a first pair of parallel opposed upright side walls 31 and a second pair of parallel opposed side walls 182. Within the side walls 31, 128 is formed a cavity 124. The side walls 31 includes end edges 125 that are beveled to form apexes 126 coplanar with the axis of symmetry B. The end edges 25 also define nadir regions 127 coincident with a working plane normal to the axis of symmetry B. The apexes 126 are fitted with the openings 30 by which the transverse arm 16 (carrying parallel arms 12 and 13) can be rotated relative to axis of rotation R as previously discussed with reference to FIG. 1. The pair of side walls 128 includes transverse end edges 129 that are also coplanar of the aforementioned working plane. Upstream of the working plane within the cavity 124 is a drive motor 130. The drive motor 130 is electrically driven and is attached relative to the transverse arm 16 via a bracket 131 having flanges 131a that attach to the side walls 31. Adjacent to face 132 of the drive motor 130 is a second bracket 133 of rectangular configuration that is penetrated by drive shaft 134 and a drive gear 135 of the drive motor 130. Note that the second bracket 133 includes broad surfaces 136 parallel the pair of the side walls 128 of the upright transverse arm 16 and is defined by a longitudinal length that is greater than its width. A transverse step 137 is formed over broad surfaces 136 at a mid-position of the bracket 133 dividing the same into a upper section 138a and a lower section 138b. A third bracket 139 is positioned parallel to the upper section 138a and is held in permanent side-by-side cantilevered relationship by a series of fasteners 140. Note that the brackets 133 and 139 constitute parts of a high temperature object box assembly generally indicated at 141. As shown best in FIG. 6, such box assembly 141 includes a pair of hubs 142a, 142b journaled to openings 143 in the brackets 133, 139 to permit their rotation relative to the brackets 133, 139 about axis of symmetry A''''. A driven gear 144 is fixedly attached at the exterior surface 145 of the hub 142b and includes gear teeth 144a which engage the drive gear 135 of drive motor 130 (see FIG. 5). The hub 142b includes a side wall 146 fitted with interior female threads 147 and a stop 148. The hub 142a is of similar construction. It includes a side wall 150 having exterior male threads 151 and an external stop 152. Housed within cavity 149 (defined radially by the mated hubs 142a, 142b and longitudinally by the stops 148, 152) are a series of disc members 153a, 153b, 154. Between neighboring disc members 153a–154 are a series of glass pieces 155 156 of uniform thickness parallel to the axis of symmetry A''''. The disc members 153a, 153b are formed of clear glass, while disc member 154 is formed of frosted glass for diffusion of the light generated by bulb 99 as shown in FIG. 5 in close proximity to the bracket 39 of the object box assembly 141. Its position is seen to be in FIG. 5 to be offset from the junction point P within the parallel arm 13, while the mirror assembly 76 is coincident with such junction point P within the parallel arm 12.

The glass pieces 155 are of small irregular structure say formed of dichromatic glass but have a uniform thickness. Hence when so position with light pressure between the disc members 153a, 153b, such glass pieces 155 can slide in two dimensions relative to the axis of symmetry A''''. Similarly, the glass pieces 156 are of similar characteristics but are larger in mean dimensions that the pieces 155. But they also have a uniform thickness. Hence they can also slide in two dimensions relative to the axis of symmetry A''''.

It is understood that various changes and modifications in the form, construction and arrangement of the kaleidoscopic system of the present invention can be made by those skilled in the art without departing from the nature and principles of the invention. For example, the system can be reduced in size to provide a still more compact kaleidoscopic system for group viewing, if desired.

What is claimed is:

1. A kaleidoscopic system for viewing kaleidoscopic images on a screen, comprising:
   (i) a Tee-shaped housing defining first and second parallel arms and a transverse arm normal to said first and second parallel arms,
   (ii) high intensity lamp mounted within one of said parallel arms,
   (iii) a view screen mounted within the other of said parallel arms, said screen permitting viewing external of said first and second parallel arms,
   (iv) an object box assembly including fixed mounting means secured to said transverse arm of said Tee-shaped housing and cantilevered into said one or said other of said parallel arms, said object box assembly also including a pair of rotatable female and male hubs threaded together forming a cavity within said one or said other of said parallel arms, transparent wall means positioned at positions of entry and egress of light emitted from said lamp, and pattern producing particles positioned within said cavity between said transparent wall means, said pattern producing particles being axially fixed relative to said transparent wall means at fixed position but movable in two dimensions normal to said axially fixed position,
   (v) a mirror-lens assembly mounted in said other of said parallel arms for providing enhanced kaleidoscopic images at said screen of said pattern producing particles,
   (vi) drive means for driving said pair of rotatable hubs, said transparent wall means and said pattern producing particles in rotation about an axis of rotation coextensive of said first and second parallel arms to change the position of said pattern producing particles in two dimensions at right angles to said axis of rotation.

2. The kaleidoscopic system of claim 1 in which said parallel arms have collinear axes of symmetry and said transverse arm defines an axis of symmetry normal to said collinear axes of symmetry of said parallel arms at a junction point P.

3. The kaleidoscopic system of claim 2 wherein said pattern producing particles are dichromatic glass of various sizes but having a fixed thickness parallel to said collinear axes of symmetry of said parallel arms.

4. The kaleidoscopic system of claim 2 in which said mirror-lens assembly is mounted in said one of said parallel arms and includes hub support having a side wall concentric of the axis of symmetry of said parallel arms, said side wall being of increased thickness over a mid- region to define a flange and being threaded over end regions, said flange being attached to said one of said parallel arms at a axial location between said screen and said junction point.

5. The kaleidoscopic system of claim 2 in which said mirror-lens assembly also includes a pair of female members threadable attached to said threaded end regions and cantilevered therefrom in opposed directions, each of said pair of female members defining a cavity and being axially movable along said axes of symmetry of said parallel arms by rotation to change with the longitudinal extent of said cavities.

6. The kaleidoscopic system of claim 5 with the addition of a tube, a compound mirror disposed lengthwise therein, said tube having a side wall threaded over end segments and in which one of said pair of female members is threadable engaged to one of said end segments of said tube to secure same relative to said hub support.

7. The kaleidoscopic system of claim 5 with the addition of a series of spacers and optic lenses captured within said cavities of said female members between a series of axial positioned stops as said longitudinal extent of said cavities is shortened to accurate enlarge and focus kaleidoscopic images at said screen as a result of light passing through said pattern producing particles and reflected by said compound mirror.

8. The kaleidoscopic system of claim 1 in which said drive means includes a drive motor mounted to said transverse arm of said Tee-shaped housing, said drive motor including a drive shaft and a drive gear drivingly connected to at least one of said male and female hubs of said object box assembly.

9. The kaleidoscopic system of claim 8 with the addition of a gear fixed to said at least one of said male and female hubs and including gear teeth connected to said drive gear of said drive motor.

10. The kaleidoscopic system of claim 1 with the addition of fan means mounted in said one parallel arm between said lamp and an entryway of said one parallel arm connected to ambient air, said fan causing cooling air to pass from said entryway adjacent to said lamp and said object box to cool same.

11. The kaleidoscopic system of claim 10 in which said transverse arm includes a port to exhaust cooling air from said Tee-shaped housing.

12. The kaleidoscopic system of claim 11 with the addition of a fared base mounted to said transverse arm downstream of said port to cause exhaust air to flow from said port in a defused, non-turbulent manner.

13. The kaleidoscopic system of claim 12 with the addition of a series of annular rings attached to said fan means and said lamp, said lamp including a longitudinally projecting bulb and socket fixedly attached one of said series of annular rings, said fan means including a housing fixedly attached to another of said series of annular rings, said series of annual rings including a plurality of tab means at their circumferential edges for attachment to said other of said parallel arms.

14. The kaleidoscopic system of claim 13 in which said tab means includes fingers parallel to said axes of symmetry of said parallel arms for attachment to said other of said parallel arms.

15. In a kaleidoscopic system for viewing kaleidoscopic images on a screen, the combination comprising:
 (i) a Tee-shaped housing defining first and second parallel arms and a transverse arm normal to said first and second parallel arms,
 (ii) a high intensity lamp mounted within one of said parallel arms,
 (iii) a view screen mounted within the other of said parallel arms, said screen permitting viewing external of said first and second parallel arms,
 (iv) an object box assembly including fixed mounting means secured to said transverse arm of said Tee-shaped housing and cantilevered into said one or said other of said parallel arms, said object box assembly also including a pair of rotatable female and male hubs threaded together forming a cavity within said one or said other of said parallel arms, transparent wall means positioned at positions of entry and egress of light emitted from said lamp, and pattern producing particles positioned within said cavity between said transparent wall means, said pattern producing particles being axially fixed relative to said transparent wall means at fixed position but movable in two dimensions normal to said axially fixed position,
 (v) a mirror-lens assembly mounted in said other of said parallel arms for providing enhanced kaleidoscopic images at said screen of said pattern producing particles,
 (vi) drive means for driving said pair of rotatable hubs, said transparent wall means and said pattern producing particles in rotation about an axis of rotation coextensive of said first and second parallel arms to change the position of said pattern producing particles in two dimensions at right angles to said axis of rotation,
 (vii) a planar support surface attached to said transverse arm of said Tee-shaped housing wherein said screen is positioned a pre-selected height relative to said support surface.

16. The combination of claim 15 in which said parallel arms have collinear axes of symmetry and said transverse arms defines an axis of symmetry normal to said collinear axes of symmetry of said parallel arms at a junction point P.

17. The combination of claim 16 in which said mirror-lens assembly is mounted in said one of said parallel arms and includes hub support having a side wall concentric of the axis of symmetry of said parallel arms, said side wall being of increased thickness over a midregion to define a flange and being threaded over end regions, said flange being attached to said one of said parallel arms at an axial location between said screen and said junction point.

18. The combination of claim 16 in which said mirror-lens assembly also includes a pair of female members threadable attached to said threaded end regions and cantilevered therefrom in opposed directions, each of said pair of female members defining a cavity and being axially movable along said axes of symmetry of said parallel arms by rotation to change with the longitudinal extent of said cavities.

19. The combination of claim 19 with the addition of a tube, a compound mirror disposed lengthwise therein, said tube having a side wall threaded over end segments and in which one of said pair of female members is threadable engaged to one of said end segments of said tube to secure same relative to said hub support.

20. The combination of claim 18 with the addition of a series of spacers and optic lenses captures within said cavities of said female members between a series of axial positioned stops as said longitudinal extent of said cavities is shortened to accurately enlarge and focus kaleidoscopic images at said screen as a result of light passing through said pattern producing particles and reflected by said compound mirror.

21. The combination of claim 15 with the addition of a gear fixed to said at least one of said male and female hubs and including gear teeth connected to said drive gear.

22. The combination of claim 15 with the addition of fan means mounted in said one parallel arm between said lamp and an entryway of said one parallel arm connected to ambient air, said fan causing cooling air to pass from said entryway adjacent to said lamp and said object box to cool same.

23. The combination of claim 22 in which said transverse arm includes a port to exhaust cooling air from said Tee-shaped housing, said port being positioned adjacent to said planar support for said transverse arm.

24. The combination of claim 23 with the addition of a fared base mounted to said transverse arm downstream of said port and to said planar support to cause exhaust air to flow from said port in a defused, nonturbulent manner across said support.

* * * * *